UNITED STATES PATENT OFFICE.

JUSTIN DUPONT, OF ARGENTEUIL, FRANCE, ASSIGNOR TO SOCIETE ANONYME DES ETABLISSEMENTS JUSTIN DUPONT, OF ARGENTEUIL, FRANCE, A CORPORATION OF FRANCE.

FLEXIBLE PRODUCT HAVING AN ACETATE-OF-CELLULOSE BASE.

1,317,276.      Specification of Letters Patent.      Patented Sept. 30, 1919.

No Drawing.      Application filed January 18, 1918. Serial No. 212,449.

*To all whom it may concern:*

Be it known that I, JUSTIN DUPONT, 1 Rue du Truet, at Argenteuil, Department of the Seine and Oise, in France, citizen of the French Republic, have invented certain new and useful Improvements in Flexible Products Having an Acetate-of-Cellulose Base; and I do hereby declare the following to be a full, clear, and exact description of the invention, such as will enable others skilled in the art to which it appertains to make and use the same.

The object of the present invention resides in the provision of a plastic composition, having an acetate of cellulose base, which possesses great durability and flexibility.

When formic aldehyde or one of its polymers, paraldehyde, or trioxymethylene is reacted upon with phenol in the presence of diluted alkali and subsequently, by the addition of a suitable quantity of acid, for example acetic acid, a compound is liberated and we obtain in the form of an oil insoluble in water, a mixture of alcohols, ortho and paraoxy-benzylic.

This complex mixture or compound is a viscous liquid at ordinary temperature. Its composition remains sensibly constant when prepared as above described.

The mixture of two alcoholic phenols, such as obtained in this reaction, and without any purification other than washing with water and drying by decantation, presents among other properties that of being susceptible of entering into the composition of plastic masses having acetate of cellulose as a base and communicating to them great flexibility and durability.

In the provision of such a plastic composition as referred to above, I mix the two alcoholic phenols, such as obtained by the reaction above described and without purification, other than by washing with water and decantation, with a mass having acetate of cellulose as a base. This produces a composition having great flexibility and durability.

In mixing various proportions of these alcohol phenols with the layers or coats of acetate of cellulose more or less flexibility is assured and the plasticity of the layer or coat may be regulated or controlled according to the purpose for which the product is to be used.

I claim:

Plastic composition derived from acetate of cellulose to which a mixture of alcohols, ortho and paraoxy-benzylic has been added.

In testimony whereof I affix my signature in presence of two witnesses.

JUSTIN DUPONT.

Witnesses:
    FRANCISCO JACOMET,
    JOHN F. SIMONS.